3,634,519
PROCESS FOR THE PRODUCTION OF
DIARYLETHERS
Francis Bentz, Cologne, Dieter Lesch, Cologne, Mulheim, and Günther Nischk, Dormagen, Germany, assignors to Farbenfabriken Bayer Aktiengesellschaft, Leverkusen, Germany
No Drawing. Filed July 26, 1968, Ser. No. 747,841
Claims priority, application Germany, Aug. 4, 1967,
F 53,147
Int. Cl. C07c 41/00
U.S. Cl. 260—612 R    4 Claims

ABSTRACT OF THE DISCLOSURE

Process for the production of diarylethers by reaction of an aromatic compound containing a nitro group and a halogen atom in the para position to each other with an aqueous solution of an alkali hydroxide in a polar organic solvent.

---

This invention relates to a process for the production of diarylethers from aromatic compounds containing an activated halogen atom.

It is known from the literature that diarylethers can be prepared by Williamson synthesis. For example, 4,4'-dinitrodiphenylether can be prepared by condensing the sodium salt of p-nitrophenol with a large excess of p-nitrochlorobenzene. A maximum yield of 4,4-dinitrodiphenyl ether amounting to 45% is obtained where the molar ratio of p-chloronitrobenzene to p-nitrophenol is 6:1.

The yield can be improved by using dimethyl sulphoxide as a solvent (U.S. patent specification No. 3,032,594). Unfortunately, one disadvantage of this process is that the phenolate has first of all to be prepared and, following reaction with p-nitrochlorobenzene, the unreacted component of p-nitrochloroenzene has to be removed by distillation with steam. Since, in addition, nitrophenolates show a marked tendency to explode at elevated temperature, these processes are extremely hazardous.

It is an object of this invention to provide a process for the production of diarylethers that avoids the disadvantages mentioned above.

This object is accomplished by a process for the production of diarylethers which comprises reacting an aromatic compound containing a nitro group and a halogen atom in the para position relatively to one another with an aqueous solution of an alkail metal hydroxide, said reacting being effected at a temperature of from 90 to 170° C. in a polar organic solvent.

In the process according to the invention, 4,4'-dinitrodiphenylether for example is obtained in accordance with the following reaction:

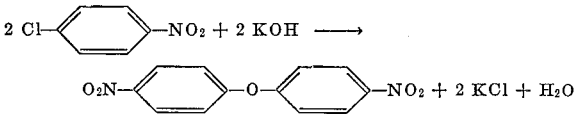

Suitable aromatic compounds include compounds of the kind containing a halogen atom and a nitro group in the para-position relatively to one another. The following compounds, for example, may be reacted: p-chloronitrobenzene, 2 - chloro - 5 - nitrodiphenyl sulphone and 3-amino-4-nitrochlorobenzene.

Concentrated aqueous solutions of alkali metal hydroxide, preferably potassium hydroxide, are used as an aqueous solution of an alkali metal hydroxide. It is of advantage to use highly concentrated aqueous solutions, preferably 40 to 55% solutions. The quantitative molar ratio of aromatic halogen compound to alkali hydroxide is preferably 1:1, although it is also possible to use a small excess of alkali, for example, a molar ratio of 1:1.1.

Polar organic solvents suitable for use in accordance with the invention include, for example, dialkyl sulphoxides such as dimethyl sulphoxide, diethyl sulphoxide and sulphones such as tetramethylene sulphone.

The reaction is carried out by dissolving the halogen-containing compound in the polar organic solvents and adding the aqueous alkali solution dropwise to the solution at a temperature of from 140 to 170° C., and preferably at a temperature of from 150 to 170° C. To complete the reaction, the reaction mixture is heated under reflux for several hours and preferably from 1 to 4 hours. To isolate the ether, the solution is poured into water on completion of the reaction, the required compound being precipitated in a high yield. It is also possible to concentrate the solution in vacuo, in which case the solvent is recovered and may be used for further reactions. The residue obtained is then recrystallised.

One particular advantage of the process according to the invention is that the phenolate formed in situ reacts with the as yet unreacted part of the compound containing the activated halogen atom in statu nascendi to form the diarylether. For this reason, this process is not endangered by explosions of the kind that readily occur in the preparation and reaction of nitrophenolates.

The dinitro diarylethers obtained by the process according to the invention are important intermediate products. After the nitro groups have been reduced, these products may be further reacted for example to form the corresponding diisocyanates, or alternatively may be used as the diamine component for polyamides.

The following examples are to further illustrate the invention without limiting it.

The parts by weight indicated in the following examples bear the same relation to the parts by volume indicated as kg. to litre.

EXAMPLE 1

157.5 parts by weight (1 mole) of p-chloronitrobenzene are dissolved in 500 parts by volume of dimethyl sulphoxide. A solution of 56 parts by weight (1 mol) of potassium hydroxide in 51 parts by volume of water is added dropwise at 170° C., as a result of which the boiling temperature falls to around 145° C. Following the dropwise addition, the mixture is stirred for 4 hours under reflux, 4,4'-dinitrodiphenylether is obtained in a yield of 86% of the theoretical by pouring the reaction mixture into about 2000 parts by volume of ice water. Melting point 143° C. (from benzene or i-butanel).

EXAMPLE 2

298.5 parts by weight (1 mol) of 6-chloro-3-nitrodiphenyl sulphone are dissolved in 1000 parts by volume of dimethyl sulphoxide. A solution of 56 parts by weight (1 mol) of potassium hydroxide in 55 parts by volume of water is added dropwise at 170° C. After 3 hours' stirring under reflux, the solution is poured into approximately 3000 parts by volume of ice water. The 4,4'-dinitro-6,6'-dibenzenesulphonyl diphenylether precipitated is suction filtered. The product can be purified by taking it up in i-butanol or by recrystallisation from ethanol. The yield comprises 92% of the theoretical. Melting point: 230° C.

EXAMPLE 3

A solution of 56 parts by weight (1 mol) of potassium hydroxide in 55 parts by volume of water is added dropwise at 170° C. to a solution of 172.5 parts by weight (1 mol) of 3-amino-4-nitrochlorobenzene in 600 parts by volume of dimethyl sulphoxide. The reaction mixture is then stirred under reflux for 4 hours. After it has been poured into 2500 parts by volume of ice water, the product is suction filtered. The residue is recrystallised from benzene. The yield of 3,3'-diamino-4,4'-dinitrodiphenylether comprises 52% of the theoretical. Melting point: 172° C.

EXAMPLE 4

157.5 parts by weight (1 mol) of p-chloronitrobenzene are dissolved in 400 parts by volume of tetramethylene sulfone. After the dropwise addition of a solution of 56 parts by weight (1 mol) of potassium hydroxide in 50 parts by volume of water at 165° C., the reaction mixture is stirred while refluxing for 3½ hours. By pouring the mixture into 1,500 parts by volume of water 4,4'-dinitrodiphenylether is obtained.

Yield: 81% of the theoretical.
M.P.: 142° C. (from benzene).

What we claim is:

1. A process for the production of 4,4'-dinitro-diphenylethers which comprises condensation of a 1-halo-4-nitrophenyl compound with an aqueous solution of 40 to 55 percent by weight of an alkali metal hydroxide, the molar ratio of said 1-halo-4-nitro-phenyl compound to said alkali metal compound being between 1:1 and 1:1.1 and said condensation being effected at temperatures of from 90° C. to 170° C. in a polar organic solvent selected from the group consisting of dialkylsulfoxides and tetramethylene sulfone.

2. The process of claim 1, said polar organic solvent being a dialkyl sulfoxide.

3. Process of claim 2 wherein the solvent is dimethyl sulfoxide.

4. Process of claim 1 wherein the solvent is tetramethylene sulfone.

References Cited

UNITED STATES PATENTS

| | | | |
|---|---|---|---|
| 1,744,961 | 1/1930 | Hale | 260—612 |
| 1,972,605 | 9/1934 | Stoesser et al. | 260—612 |
| 2,008,987 | 7/1935 | Marx et al. | 260—612 |
| 3,422,154 | 1/1969 | Laucius et al. | 260—612 |

BERNARD HELFIN, Primary Examiner

U.S. Cl. X.R.

260—571, 607 A